United States Patent [19]
Weaver, Jr.

[11] Patent Number: 5,261,544
[45] Date of Patent: Nov. 16, 1993

[54] CONTAINER FOR VISCOUS PRODUCTS

[75] Inventor: Edmund A. Weaver, Jr., Racine, Wis.

[73] Assignee: Kraft General Foods, Inc., Northfield, Ill.

[21] Appl. No.: 954,763

[22] Filed: Sep. 30, 1992

[51] Int. Cl.$^5$ ............................................. B65D 1/10
[52] U.S. Cl. .................................. 215/1 C; 220/666; 220/675; 215/100 A
[58] Field of Search ............ 220/675, 770, 666; 215/1 C, 100 A

[56] References Cited

U.S. PATENT DOCUMENTS

| D. 93,526 | 7/1934 | Smith . | |
|---|---|---|---|
| D. 129,158 | 1/1941 | Dexter . | |
| D. 205,967 | 10/1966 | Platte | D8/6 |
| D. 244,579 | 6/1977 | Dinand | D9/167 |
| D. 244,912 | 7/1977 | Zamora Conesa | D9/167 |
| D. 285,538 | 9/1986 | Trumstedt | D9/408 |
| D. 288,294 | 2/1987 | Taylor et al. | D9/408 |
| 3,536,223 | 10/1970 | Muhlhoff et al. | 215/1 |
| 3,537,498 | 11/1970 | Amand | 215/100 A |
| 4,387,816 | 6/1983 | Weckman | 215/1 C |
| 4,804,097 | 2/1989 | Alberghini et al. | 220/675 |
| 4,993,565 | 2/1991 | Ota et al. | 215/1 C |
| 5,092,474 | 3/1992 | Leigner | 215/1 C |
| 5,123,554 | 6/1992 | Arvidson et al. | 220/675 |
| 5,141,120 | 8/1992 | Brown et al. | 220/675 |
| 5,148,930 | 9/1992 | Ota et al. | 215/1 C |

Primary Examiner—Joseph M. Moy
Attorney, Agent, or Firm—Fitch, Even, Tabin & Flannery

[57] ABSTRACT

A food product container comprising upstanding front and back walls, a pair of upstanding side walls, a generally horizontal bottom and an upper mouth portion having a shoulder area sloping downwardly therefrom, wherein the front and back walls have recesses therein which are configured to cooperate with one another to facilitate manual gripping of the container by the hand of the user spanning one side wall of the container, with the user's thumb and one or more fingers opposed thereto engaging opposite recess surfaces. Each of the recesses preferably comprises a recessed panel having an outwardly convex, generally rectangular central portion and a rim angled outwardly from the central portion. A ridge having a relatively small radius of curvature is defined about the outer periphery of the rim. At each upper corner, the ridge has an arcuate configuration and curves slightly outward relative to the depth of the container. The container is suitable for use with viscous food products, and in a preferred embodiment has a capacity of about ½-gallon.

10 Claims, 1 Drawing Sheet

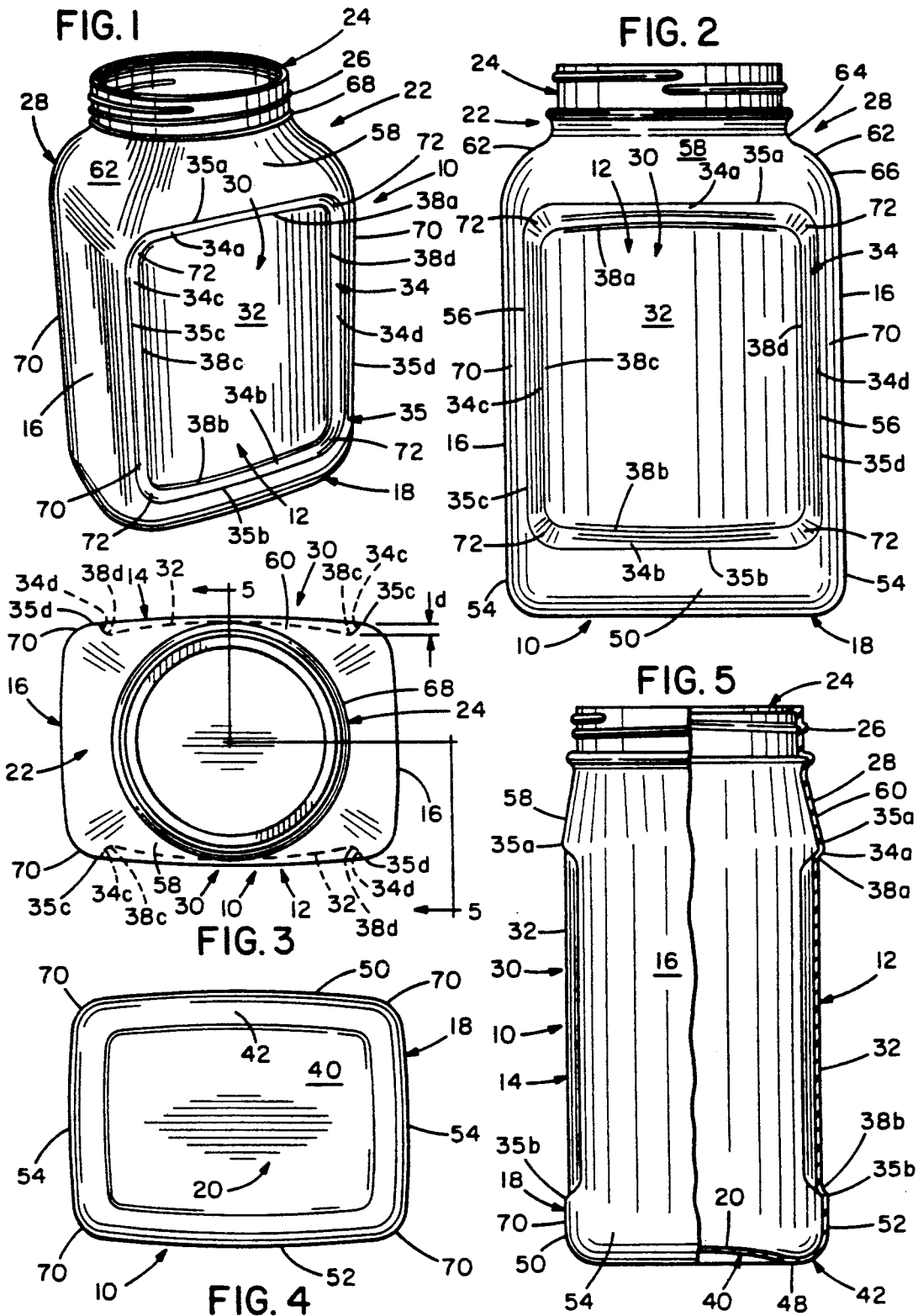

CONTAINER FOR VISCOUS PRODUCTS

FIELD OF THE INVENTION

The present invention relates generally to containers, and more particularly to a container for viscous products having means to facilitate manual handling of the container.

BACKGROUND OF THE INVENTION

In providing a container for commercial packaging of food products, among the considerations that must be addressed are the ability of the container to receive food product in filling operations; the degree of difficulty that will be encountered by the consumer in dispensing product from the container; the ability of the container to be handled and to withstand various loads, such as stacking loads, during filling, sealing, shipping, display and consumer use; and the ability of the container to be packed efficiently among like containers. Also, it is desirable that such a container have ample label display area and an aesthetically pleasing appearance.

A disadvantage with some larger containers is their inability to be easily handled and controlled, particularly during dispensing of product, when it may be desirable to hold the container in an inclined position with one hand to pour, shake, spoon or otherwise dispense a viscous food product such as mayonnaise, salad dressing, or other material of similar consistency.

In the past, much effort has been directed toward facilitating manual control and handling of large containers. Such attempts include providing grip enhancing surfaces and/or ribs. For example, U.S. Pat. No. 4,804,097 discloses a container with hand-grip indentations having a pair of vertical surfaces disposed at an obtuse angle with respect to one another and joined together at a common edge. Additionally, U.S. Pat. No. 4,993,656 discloses a container with a recess having a tapered part and a plurality of vertical ribs or anti-slip strips for enhanced gripping.

Each of the containers disclosed in the '097 and '656 patents requires reinforcing features to counterbalance any increase in potential for the container to collapse, resulting from the design of the particular gripping feature. The disclosed reinforcing features include vertical and/or horizonal ribs or recesses. The gripping and reinforcement features significantly reduce the area available for labeling of the containers, and decrease the internal volume of the container without significantly reducing its shelf space requirements and without decreasing shipping volume, i.e., the volume required for each container when boxed with other like containers.

A general object of the present invention is to provide a relatively large container suitable for commercial packaging of food product which has improved means to facilitate manual gripping of the container during dispensing of product therefrom.

SUMMARY OF THE INVENTION

In accordance with the invention, there is provided a container comprising upstanding front and back walls, a pair of upstanding side walls, a generally horizontal bottom, and an upper mouth portion having a shoulder area sloping downwardly therefrom, wherein the front and back walls have recesses therein which are configured to cooperate with one another to facilitate manual gripping of the container by the hand of a user spanning one side wall of the container, with the user's thumb and one or more fingers opposed thereto engaging opposite recess surfaces. Each of the recesses preferably comprises a recessed panel having a generally rectangular central portion and a rim angled outwardly from the central portion. The central portion is preferably convex, having a radius of curvature about a generally vertical axis so as to be configured as a portion of a cylinder.

A ridge having a relatively small radius of curvature is defined about the outer periphery of the rim. The ridge is substantially vertical along the sides of the recess. At each corner, the ridge has an arcuate configuration, providing a transition from a substantially vertical side portion to a horizontal upper or lower portion, as shown in FIG. 2, and also curves slightly outward relative to the depth of the container as shown in FIG. 5. Thus, on each of the left and right sides of the container, the ridges on the front and rear of the container are parallel to one another along the substantially vertical sides of the respective recesses, but diverge adjacent the corners. Accordingly, the depth of the container, measured as the distance between corresponding points on the respective front and rear ridges, increases proceeding from the vertical side portions to the upper corners of the ridges. The configuration of the container enables the container to be securely gripped by engagement of soft tissue on the tips of opposed fingers and thumb of the user, and the corner configuration enables the tips of the opposed thumb and fingers of the user to achieve stable equilibrium in corresponding corners of the opposite recesses when gripping force is applied to the container, even if the container and/or the hands of the user are wet or slippery.

Further objects and features of the invention are described below and shown in the accompanying drawings.

BRIEF DESCRIPTION OF THE DRAWINGS

FIG. 1 is a perspective view of a container embodying the invention;

FIG. 2 is a front elevational view of the container of FIG. 1;

FIG. 3 is a top plan view of the container of FIG. 1;

FIG. 4 is a bottom plan view of the container of FIG. 1; and

FIG. 5 is a side elevational view of the container of FIG. 1 with a partial cross-sectional view taken along line 5—5 of FIG. 3.

DETAILED DESCRIPTION OF THE PREFERRED EMBODIMENT

As shown in the drawings for purposes of illustration, the invention is preferably embodied in a molded polymeric jar or container 10. In the illustrated embodiment as shown in FIG. 1, the container 10 has a generally rectangular configuration. That is, the container 10 comprises generally rectangular, upstanding front and back walls 12 and 14 and generally rectangular side walls 16. The container 10 has a base 18 with a generally horizontal bottom wall 20, and an upper end 22 with a shoulder area 28 and an annular mouth 24. The shoulder area 28 slopes downward from the annular mouth 24 to the upstanding front, back and side walls 12, 14, and 16, and the annular mouth 24 includes means 26 for cooperating with a closure to close the container 10. The front and back walls 12 and 14 each intersect the side walls 16 along rounded vertical corners 70.

In accordance with the invention, front and back walls 12 and 14 have recesses 30 formed therein which are particularly configured to cooperate to enable the container to be gripped securely on the front and back walls 12 and 14 by the opposed thumb and fingers of a hand traversing one side wall 16 of the container, while also providing a large recessed surface suitable for adhesion of a label. Each recess 30 comprises a substantially vertical central portion 32 surrounded by a peripheral rim 34. Each central portion 32 preferably has a generally rectangular configuration as viewed in elevation, and is outwardly convex, defining a relatively large radius of curvature about a substantially vertical axis. More particularly, each central portion 32 is configured as a portion of a substantially vertical cylinder. The rim 34 cooperates with the central portion 32 to form at their intersection an elongated groove comprising a top groove 38a, bottom groove 38b and side grooves 38c and 38d to receive the tips of the opposed fingers and thumb of the user.

As best illustrated in FIGS. 1 and 2 with reference to the front wall 12, which is substantially identical to the back wall 14, the rim 34 comprises a generally X, horizontal top portion 34a, a generally horizontal bottom portion 34b and generally vertical side portions 34c and 34d. A ridge 35 extends about the periphery of the rim 34. The top and bottom portions 34a and 34b of the rim intersect the shoulder area 28 and base 18 respectively to define generally horizontal top and bottom ridges 35a and 35b. The side portions 34c and 34d intersect the rounded vertical corners 70 of the container to define substantially vertical ridges 35c and 35d, each having a relatively small radius of curvature about a substantially vertical axis.

The rim 34 has a generally rectangular configuration with four arcuate corner areas 72. At the corner areas 72, the rim 34, preferably has an inner radius of curvature of about ¼ in. and an outer radius of curvature Of about ½ in. as viewed in elevation. The corner areas 72 of the rim are wider than the adjacent top, bottom and side portions of the rim.

To facilitate handling of the container while also facilitating dispensing of product from the container, several considerations are taken into account in dimensioning the container in the preferred embodiment. The depth of the container, i.e., the horizontal dimension of each side wall, is preferably less than about 4½ in. to permit the user's hand to comfortably span the side wall so that the thumb and fingers may engage the opposite front and back walls of the container. In the preferred embodiment, the horizontal dimension of each side wall, i.e., the distance between the opposite vertical ridges 35c and 35d adjacent each side wall, is about 3¼ in. A second consideration is the radius of curvature on the ridges. Generally, reducing the radius of curvature of the ridges improves the handling characteristics of the container, whereas increasing the radius tends to facilitate product removal along the interior of the container inside of the ridges. To enable the container to be gripped securely by engagement of the thumb and fingers with the ridges while also facilitating dispensing of product, in the preferred embodiment, the vertical side ridges 35c and 35d have a radius of curvature of about ⅛ in. about a substantially vertical axis, and the top and bottom ridges 35a and 35b each have a radius of curvature of about ¼ in. about a horizontal axis.

The depth "d" (FIG. 3) of the side grooves 38c and 38d defined by the intersection of the rim 34 with the central portion 32 of each recess 30 also affects the handling characteristics of the container, as well as product dispensing. In the illustrated embodiment, the depth of the vertical side grooves 38c and 38d is about 5/32 in.

The above-described configuration has been found to provide good handling characteristics wherein soft tissue on the opposed fingers and thumb of the user is engaged and deflected by opposite ridges such as ridge 35c on the front of the container and ridge 35d on the rear thereof, shown in FIG. 3. The fingers and thumb conform somewhat to the shapes of the ridges 35 and grooves 38 on each of the front and back walls 12 and 14. The vertical ridges 35c and 35d preferably extend for at least about ⅔ of the container height to provide a wide range of positions for manual engagement of the container. This is especially advantageous for relatively large containers holding pourable viscous food products, such as viscous salad dressing, where a pronounced change in the container's center of gravity may occur during dispensing. A user may easily readjust his or her grip in response to a shift in the center of gravity.

The arcuate corner areas 72, where the rim 34 has wider surface area, preferably are capable of functioning as stops for the thumbs and fingers of the user. To this end, at each corner, where the peripheral ridge 35 has an arcuate configuration, providing a transition from a substantially vertical side portion 35c or 35d to a horizontal upper or lower portion 35a or 35b, the ridge curves slightly outward to increase the depth of the container as shown in FIG. 5. Thus, on each of the left and right sides of the container, the ridges 35c and 35d on the front and rear of the container are parallel to one another along the substantially vertical sides of the respective recesses, but diverge adjacent the corners 72. Accordingly, the depth of the container, measured as the distance between opposite points on the respective front and rear ridges, increases proceeding from a vertical side portion 35c and 35d along one of the corners of the ridges. This helps to enable the tips of an opposed thumb and finger of the user to achieve stable equilibrium in corresponding corners of the opposite front and back recesses 30 when gripping force is applied to the container, even if the container and/or the hands of the user are wet or slippery.

Thus, if a user is gripping the container 10 in the manner described above and the container begins to slide, the engagement of the fingers and thumb with opposite arcuate corner areas 72 may help the user to regain control of the container without dropping it. Also, if the user is gripping the container 10 by engaging the opposite convex central portions 32 of the recesses on the front and back walls, and applying inward force to the opposite convex surfaces, in the event of slippage, the opposed fingers and thumb can achieve stable equilibrium in engagement with the substantially vertical side portions 34c and 34d of the rim on the front and back walls respectively.

Turning now to FIG. 4, the bottom wall 20 has a generally rectangular configuration, as viewed in bottom plan with a recessed central portion 40, surrounded by an outwardly convex rim 42. The rim 42 provides stability for the container when supported upon a flat horizontal surface.

Referring to FIGS. 2 and 5, the base 18 comprises lower portions 50, 52 and 54 of the upstanding front, back and side walls 12, 14 and 16, respectively. Each lower portion 50, 52 and 54 is contiguous with the rim 42. Each of the lower portions 50 and 52 of the front wall 12 and back wall 14 intersects the lower portions 54 of the side walls to form lower portions of the rounded vertical corners 70. Each of the vertical corners 70 preferably has a radius of curvature of about ½ in. about a vertical axis.

As shown in FIGS. 3 and 4, the front, back and side walls 12, 14 and 16 may be substantially planar or may be slightly outwardly convex.

The shoulder area 28 comprises front and back shoulder portions 58 and 60, respectively, and a pair of side shoulder portions 62. The slope of the front and back shoulder portions 58 and 60 is greater than that of side shoulder portions 62, due to the width of the container 10 being greater than its depth.

The mouth 24 preferably has an inner diameter of about 3 in. and an exterior finish 25 which includes means 26 for cooperating with a closure such as an exterior thread for cooperating with a corresponding interior thread on an inside annular wall of the closure, and a projecting ring 68 therebelow. The combination of the wide mouth 24 and the steeply-sloped shoulder area 28 contributes to effective dispensing of the contents.

The illustrated container 10 is preferably blow-molded from a suitable polymeric material with a minimum wall thickness of at least about 10 mils, and an empty weight of about 60 grams. The ½ gallon container described herein has a height of about 8 in.; width of about 5 in.; and maximum depth of about 4 in. The preferred recess 30 has a vertical height of about 5 in. and a width of about 4 in. to provide sufficient room to attach product-identifying labels. The preferred rim 34 has a minimum surface width of about 0.2 in. The outwardly convex central portion 32 of each recess 30 has a preferred minimum depth of about 0.02 in. at its central region. Each of the central panels 32 is preferably vertical and preferably has a radius of curvature about a vertical axis of about 6 in.

From the foregoing it should be appreciated that the invention provides a container having means to facilitate manual gripping of the container and dispensing of a viscous food product. In addition, the container enables relatively efficient use of space in transportation and display, in that it interfits with like containers with relatively little interstitial space as compared with many other containers. The container provides surface area for attaching product-identifying labels, and compares favorably with conventional glass containers with respect to impact resistance.

While the invention has been described in conjunction with a specific embodiment, various alternatives, modifications, and variations will be apparent to those skilled in the art in light of the foregoing description.

What is claimed is:

1. A container comprising
a pair of upstanding side walls;
upstanding front and back walls, each of the front and back walls defining a recess therein;
said recesses being configured to cooperate with one another to facilitate gripping of the container by a hand spanning one of said side walls with a thumb engaging one of said recesses and one or more fingers engaging the other of said recesses;
a generally horizontal bottom being contiguous with the front, back and side walls;
an upper mouth portion comprising means for cooperating with a closure to seal the container; and
a shoulder area sloping downwardly from the upper mouth portion to the front, back and side walls;
each recess being generally rectangular and comprising a central portion and a peripheral rim portion angled outward relative to said central portion to define an elongated groove therebetween and facilitate gripping of the container;
each peripheral rim portion comprising first and second substantially vertical side portions, a substantially horizontal top portion, a substantially horizontal bottom portion, and rounded corner portions, each of said first and second substantially vertical side portions of said rim portion having a substantially uniform predetermined width along substantially its entire length;
each of said side portions intersecting said top and bottom portions at said rounded corner portions;
each of said rounded corner portions having increased width relative to adjacent portions of said rim and having a radius of curvature of at least about ¼ in.;
each of the substantially horizontal top and bottom portions of each peripheral rim portion having a relatively narrow middle portion, and having increasing width from said relatively narrow middle portion toward said rounded corner portions;
the central portion of each recess being outwardly convex so as to define a radius of curvature about a substantially vertical axis.

2. A container in accordance with claim 1 wherein each said rim portion has a ridge having a relatively small radius of curvature extending about its outer periphery, the depth of said container is defined by the distance between said ridges;
said opposite ridges being substantially parallel along said side portions of the respective rims, but being divergent along corresponding corner portions of said rims.

3. A container in accordance with claim 1 wherein the upstanding side walls are outwardly convex.

4. A container in accordance with claim 1 wherein the container has a depth of less than about 4½ in.

5. A container comprising:
a pair of upstanding side walls;
upstanding front and back walls, each of the front and back walls comprising a recess;
said recesses being configured to cooperate with one another to facilitate gripping of the container by a hand spanning one of said side walls with a thumb engaging one of said recesses and one or more fingers engaging the other of said recesses;
a generally horizontal bottom contiguous with the front, back and side walls;
an upper mouth portion comprising means for cooperating with a closure to seal the container; and
a shoulder area sloping downwardly from the upper mouth portion to the front, back and side walls;
each of the recesses being generally rectangular and comprising a central portion and a peripheral rim portion, the peripheral rim portion comprising first and second substantially vertical side portions, a substantially horizontal top portion, a substantially horizontal bottom portion, and rounded corner portions;
each of said corner portions having a radius of curvature of at least about ¼ in.;

each of said side portions intersecting said top and bottom portions at said rounded corner portions;

said rim portion of each recess being angled outward relative to said central portion to define an elongated groove therebetween and facilitate gripping of the container;

said central portion being outwardly convex so as to define a radius of curvature about a substantially vertical axis;

each of the substantially horizontal top and bottom portions of each peripheral rim portion having a relatively narrow middle portion, and having increasing width from said relatively narrow middle portion toward said rounded corner portions.

6. A container in accordance with claim 5 wherein said rim portion of each recess has maximum width at the rounded corner portions thereof.

7. A container in accordance with claim 5 wherein the container has a generally rectangular cross-section as viewed in plan and wherein the front and back walls intersect the side walls to define substantially vertical rounded corners.

8. A container in accordance with claim 5 wherein each of said substantially vertical side portions has a radius of curvature of about ⅛ in. about a substantially vertical axis.

9. A container for viscous food product having an internal volume of about ½ gallon comprising:

a pair of upstanding side walls;

upstanding front and back walls, each of the front and back walls defining a recess therein;

said recesses being configured to cooperate with one another to facilitate gripping of the container by a hand spanning one of said side walls with a thumb engaging one of said recesses and one or more fingers engaging the other of said recesses;

a generally horizontal bottom contiguous with the front, back and side walls;

an upper mouth portion comprising means for cooperating with a closure to seal the container; and a shoulder area sloping downwardly from the upper mouth portion to the front, back and side walls;

each of the recesses being generally rectangular and comprising a central portion and a peripheral rim portion, the peripheral rim portion comprising first and second substantially vertical side portions, a substantially horizontal top portion, a substantially horizontal top portion, a substantially horizontal bottom portion, and rounded corner portions;

each of said corner portions having a radius of curvature of at least about ¼ in.;

each of the substantially horizontal top and bottom portions of each peripheral rim portion having a relatively narrow middle portion, and having increasing width from said relatively narrow middle portion toward said rounded corner portions;

each of said side portions intersecting said top and bottom portions at said rounded corner portions;

said rim portion being angled outward relative to said central portion;

said central portion being outwardly convex so as to define a radius of curvature about a substantially vertical axis;

said rim portion of each recess having maximum width at the rounded corner portions thereof;

said rim portions having outer peripheral ridges on said front and back walls which diverge at said rounded corner portions such that the container has greater depth at said rounded corner portions than at said side portions of said rim.

10. A container in accordance with claim 9 wherein each of said outer peripheral ridges of said side portions of said rim has a radius of curvature of about ⅛ in.

* * * * *